M. WOLFF.
RIM WITH MOVABLE BOTTOM.
APPLICATION FILED JAN. 6, 1913.
1,084,518.
Patented Jan. 13, 1914.
2 SHEETS—SHEET 1.
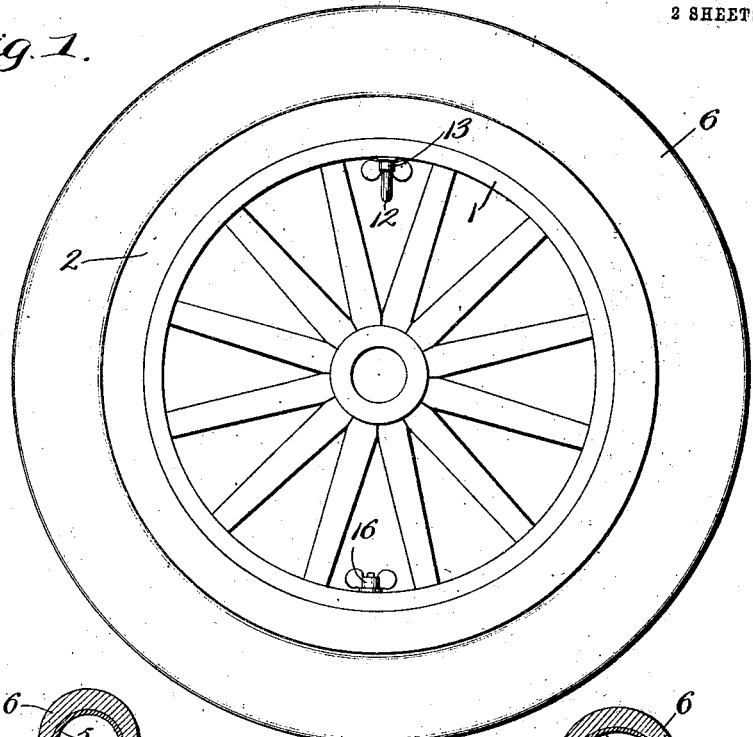
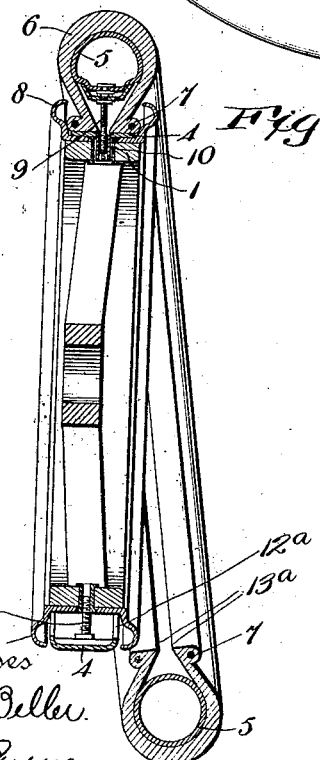
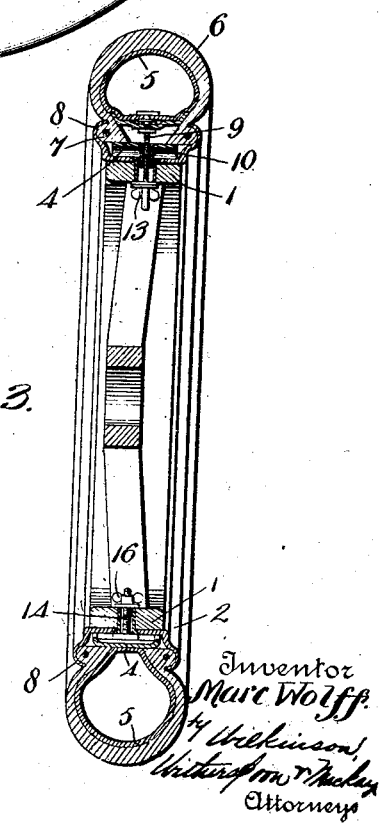

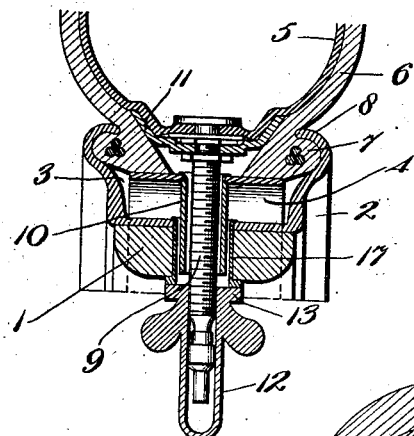
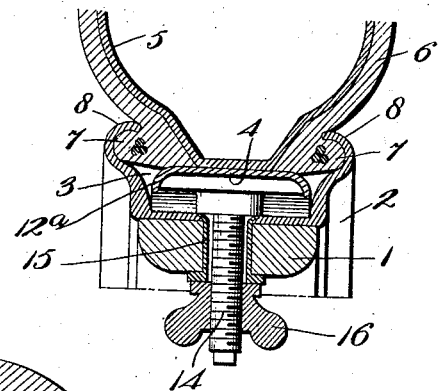
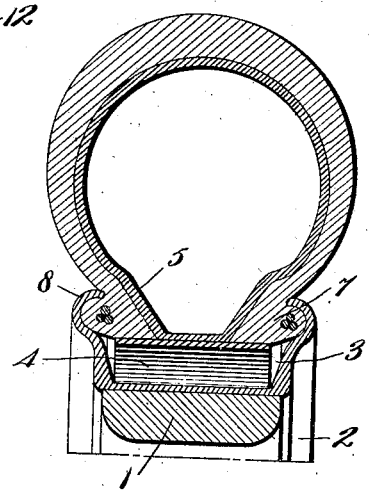
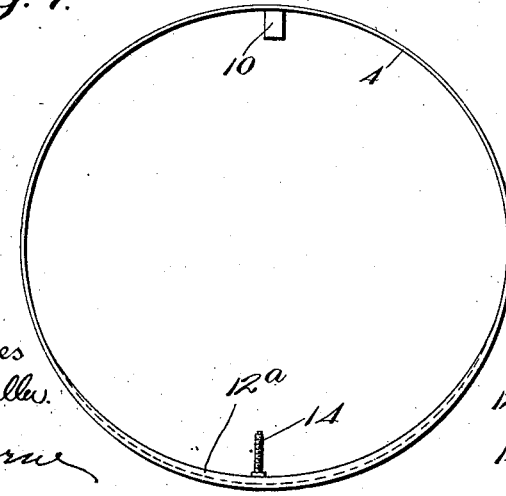

UNITED STATES PATENT OFFICE.

MARC WOLFF, OF CHELSEA, ENGLAND.

RIM WITH MOVABLE BOTTOM.

1,084,518.   Specification of Letters Patent.   Patented Jan. 13, 1914.

Application filed January 6, 1913. Serial No. 740,527.

*To all whom it may concern:*

Be it known that I, MARC WOLFF, a citizen of the French Republic, residing at Chelsea, county of Middlesex, England, have invented certain new and useful Improvements in Rims with Movable Bottoms; and I do hereby declare the following to be a full, clear, and exact description of the invention, such as will enable others skilled in the art to which it appertains to make and use the same.

The present invention relates to wheel rims and tires for vehicles, especially automobiles, and has for its purpose to provide a construction wherein a permanent rim may have the tire mounted thereon or demounted therefrom by a simple and quickly performed operation.

The invention is especially applicable to wheel rims and tires of the clencher type, and embodies an independent tire sustaining ring which directly supports the tire and also serves to securely hold the clencher elements in locking engagement.

With these and other objects in view the invention consists in the novel details of construction and combinations of parts more fully hereinafter disclosed and particularly pointed out in the claims.

Referring to the accompanying drawings forming a part of this specification, in which like numerals designate like parts in all the views:—Figure 1 is a side elevational view of a vehicle wheel equipped with the present improvement; Fig. 2 is a central sectional view illustrating the initial step of mounting the tire on the wheel; Fig. 3 is a central sectional view showing the tire mounted; Fig. 4 is a transverse sectional view taken through the tire and rim and showing the valve; Fig. 5 is a similar view taken at the diametrically opposite point of the wheel, and showing the ring securing device; Fig. 6 is a transverse sectional view taken at a point intermediate of the tire valve and ring securing device; Fig. 7 is a detail view in side elevation of the tire sustaining ring; and Fig. 8 is a central sectional view of the same.

Referring to the construction in detail, 1 designates the wheel felly, on which is permanently mounted the rim 2 of the clencher type, and which has a relatively deep trough 3 adapted to receive the tire sustaining ring 4 and permit a free independent movement thereof for a purpose to be presently stated.

The tire comprises the usual inner tube 5 and outer covering or shoe 6 having wired beaded edges 7 that engage and interlock with the clencher elements 8 of the rim 2 in the usual manner. The inner tube 5 is provided with the usual valve 9 that passes through a guiding tube or socket 10 secured to the ring 4, and is protected thereby. The plate 11 of the valve serves to keep the beads 7 of the tire cover in engagement with the clenchers 8 of the rim when the inner tube is deflated. And the valve cap 12, having a winged nut 13 screw-threaded on the valve 9, serves to hold the valve plate 11 against the beads of the cover, as will be understood from an inspection of Fig. 4 of the drawings.

The sustaining ring 4 is of endless rigid metal and substantially flat throughout, as illustrated in Figs. 7 and 8. Said ring is located within the trough 3 of the wheel rim 2, and in that position engages with the inner tube 5 and the beads 7 of the cover, and sustains the tire for its full inner circumference, and also holds the beads 7 of the tire cover in secure engagement with the clenchers 8 of the wheel rim. A portion of the ring 4, viz., that part diametrically opposite the socket 10, has the side edges thereof turned inwardly to provide flanges 12ª, which are gradually tapered as shown. The function of said flanges 12ª is to serve as a guard (see Fig. 2), and prevent the edges 13ª of the beads 7 from being caught by the ring 4 when the tire is being mounted.

The means for securing the ring 4 to prevent that member from slipping relatively to the wheel rim consists of a screw-threaded bolt 14 that is secured to said ring at the flanged portion thereof. Said bolt fits within a socket piece 15 on the wheel felly 1 with the smallest amount of play therein, and is secured to the wheel felly through the medium of a winged nut 16 screw-threaded on said bolt.

The operation of mounting or demounting the tire is substantially as follows:—The inner tube being slightly inflated, the wheel is turned until the socket 10 of the wheel is at the top, as in Fig. 2. The beads valve of the tire cover are then introduced between the clenchers of the rim and the valve 9 fitted into the socket 10, and said socket 10 is fitted within the socket piece 17 on the felly 1. In this position, the sustaining ring and tire are at the bottom of the rim trough, as in Fig. 2, and consequently the tire and ring are eccentric to said rim. It is now necessary only to press the cover at the opposite or lower part of the rim to make the beads of the cover pass over the clenchers of the rim, and then to give the wheel a half turn to make the ring and the tire center themselves in the rim, which they will obviously do through their own weight when the wheel is turned as stated. The beads then take their proper position in the clenchers of the rim when the tire is inflated, as in Fig. 3. The ring is then secured in position within the trough of the rim by screwing up the nut 13 on the valve 9, and the nut 16 on the securing bolt 14. To demount the tire, the operation just stated is performed in the reverse order.

It is obvious that those skilled in the art may vary the details of construction and arrangement of parts without departing from the spirit of my invention, and therefore I do not wish to be limited to such features except as may be required by the claims.

What I claim is:—

1. In a vehicle wheel the combination with a trough-shaped rim having edges hooked over inward and adapted to engage the edges of a clencher tire, of a continuous ring mounted in the trough-shaped portion of said rim and adapted to engage the inner portion of the tire, with means for centering said ring in said rim and holding it in the centered position, comprising a hollow sleeve projecting inwardly from said ring and adapted to receive the valve stem of the tire, a screw-threaded bolt projecting inwardly from said ring opposite to said sleeve, and passing through the rim, and a nut engaging said bolt, substantially as described.

2. In a vehicle wheel the combination with a trough-shaped rim having edges hooked over inward and adapted to engage the edges of a clencher tire, of a continuous ring mounted in the trough-shaped portion of said rim and adapted to engage the inner portion of the tire, with means for centering said ring in said rim and holding it in the centered position, comprising a hollow sleeve projecting inwardly from said ring and adapted to receive the valve stem of the tire, a screw-threaded bolt projecting inwardly from said ring opposite to said sleeve, and passing through the rim, the said ring being provided with crescent-shaped flanges at either side of said bolt, and a nut engaging said bolt, substantially as described.

3. In a vehicle wheel the combination with a felly band, of a trough-shaped rim secured thereto, a continuous ring mounted in the trough-shaped portion of said rim and adapted to engage the inner portion of the tire, with means for centering said ring in said rim and holding it in the centered position, comprising a hollow sleeve projecting inwardly from said ring and adapted to pass through the rim and felly band and also to receive the valve stem, a screw-threaded bolt projecting inwardly from said ring opposite to said sleeve, and adapted to pass through the rim and felly band, and a nut engaging said bolt, substantially as described.

4. In a vehicle wheel the combination with a felly band, of a trough-shaped rim secured thereto, a continuous ring mounted in the trough-shaped portion of said rim and adapted to engage the inner portion of the tire, with means for centering said ring in said rim and holding it in the centered position, comprising a hollow sleeve projecting inwardly from said ring and adapted to pass through the rim and felly band and also to receive the valve stem, a screw-threaded bolt projecting inwardly from said ring opposite to said sleeve, and adapted to pass through the rim and felly band, the said ring being provided with crescent-shaped flanges at either side of said bolt, and a nut engaging said bolt, substantially as described.

In testimony whereof, I affix my signature, in presence of two witnesses.

MARC WOLFF.

Witnesses:
GEORGE E. LIGHT,
LUCIEN MEMMINGER.